(12) United States Patent
Hotta

(10) Patent No.: US 12,133,509 B2
(45) Date of Patent: Nov. 5, 2024

(54) WHEELCHAIR FOR QUADRUPEDAL ANIMALS

(71) Applicant: Sunteqnos Corporation, Akashi (JP)

(72) Inventor: Hitoshi Hotta, Kobe (JP)

(73) Assignee: Sunteqnos Corporation, Akashi (JP)

( * ) Notice: Subject to any disclaimer, the term of this patent is extended or adjusted under 35 U.S.C. 154(b) by 0 days.

(21) Appl. No.: 18/566,094

(22) PCT Filed: Jun. 20, 2022

(86) PCT No.: PCT/JP2022/024447
§ 371 (c)(1),
(2) Date: Dec. 1, 2023

(87) PCT Pub. No.: WO2023/248269
PCT Pub. Date: Dec. 28, 2023

(65) Prior Publication Data
US 2024/0260544 A1  Aug. 8, 2024

(51) Int. Cl.
*A01K 15/02* (2006.01)
*A01K 27/00* (2006.01)
*A01K 29/00* (2006.01)

(52) U.S. Cl.
CPC .......... *A01K 15/027* (2013.01); *A01K 27/002* (2013.01); *A01K 29/005* (2013.01)

(58) Field of Classification Search
CPC .... A01K 15/02; A01K 15/027; A01K 27/002; A01K 29/00
See application file for complete search history.

(56) References Cited

U.S. PATENT DOCUMENTS

| | | | | |
|---|---|---|---|---|
| 2,546,726 A | * | 3/1951 | Creamer, Jr. | A01K 13/00 |
| | | | | 280/47.131 |
| 2,976,840 A | * | 3/1961 | Hugus | A61D 9/00 |
| | | | | 119/727 |

(Continued)

FOREIGN PATENT DOCUMENTS

| | | |
|---|---|---|
| CN | 215607418 U | 8/2021 |
| JP | 5460916 B1 | 1/2014 |

(Continued)

*Primary Examiner* — Yvonne R Abbott-Lewis
(74) *Attorney, Agent, or Firm* — j-pat U.S. Patent Legal Services; James W. Judge

(57) ABSTRACT

A wheelchair for quadrupedal animals enables a limb-disabled four-legged animal, with its trunk cradled in the wheelchair's harness, not only to ambulate on its own, but also, upon halting its wheelchair-assisted ambulation, to transition into sitting and prone positions, and from either of those positions, to transition back into a standing position to again ambulate on its own, independently, without need for human manual assistance. The quadrupedal animal wheelchair includes: a quadruped-supporting main frame; the trunk-cradling harness; at least a pair of wheel stays carrying wheels; a control unit; a wheel-state sensor; and drive mechanisms for altering the position of the wheels in the wheel stays. Analyzing wheel state input from the sensor, the control unit determines wheel position, and commands the drive mechanisms to alter the wheel positions so as to transition the wheelchair into and back from positions allowing the animal to sit, lie prone, or stand.

5 Claims, 12 Drawing Sheets

(56) References Cited

U.S. PATENT DOCUMENTS

| | | | | |
|---|---|---|---|---|
| 3,215,117 | A * | 11/1965 | Short | A01K 13/00 |
| | | | | 119/727 |
| 3,241,851 | A * | 3/1966 | Dingbaum | A61D 9/00 |
| | | | | 280/43 |
| 3,406,661 | A * | 10/1968 | Parkes | A61D 9/00 |
| | | | | 119/727 |
| 4,375,203 | A * | 3/1983 | Parkes | A61D 9/00 |
| | | | | 119/727 |
| 4,777,910 | A * | 10/1988 | Pecor | A01K 15/027 |
| | | | | 119/702 |
| 4,821,676 | A * | 4/1989 | Hulterstrum | A61D 9/00 |
| | | | | 119/727 |
| 5,224,444 | A * | 7/1993 | Hill | A61H 3/04 |
| | | | | 119/727 |
| 6,659,478 | B2 * | 12/2003 | Hallgrimsson | A61G 5/125 |
| | | | | 280/643 |
| 7,549,398 | B2 * | 6/2009 | Robinson | A61D 3/00 |
| | | | | 119/727 |
| 8,919,291 | B2 * | 12/2014 | De La Celle | A01K 15/027 |
| | | | | 119/727 |
| 9,179,646 | B2 * | 11/2015 | Shalom | A61H 3/04 |
| 10,765,087 | B1 * | 9/2020 | Massey | A61H 3/04 |
| 11,547,091 | B1 * | 1/2023 | Cook | B62B 13/06 |
| 11,951,068 | B2 * | 4/2024 | Koreeda | A61D 9/00 |
| 11,969,390 | B2 * | 4/2024 | Robinson | A61D 3/00 |
| 2006/0102091 | A1 * | 5/2006 | Kissinger | A61B 5/15003 |
| | | | | 604/151 |
| 2009/0101084 | A1 * | 4/2009 | Robinson | A61D 3/00 |
| | | | | 119/843 |
| 2013/0104813 | A1 * | 5/2013 | Shalom | A01K 15/02 |
| | | | | 119/727 |

FOREIGN PATENT DOCUMENTS

| | | |
|---|---|---|
| JP | 3209674 U | 3/2017 |
| WO | WO2018147022 A1 | 8/2018 |
| WO | WO2021024967 A1 | 2/2021 |

\* cited by examiner

WHEELCHAIR FOR QUADRUPEDAL ANIMALS

TECHNICAL FIELD

The present invention, in wheelchairs that quadrupedal animals use who, handicapped by a debilitated limb or loss of a portion of their legs, have become disabled from walking, relates to a wheelchair for quadrupedal animals that enables, when ambulation is halted, transitioning to a sitting position as well as a prone position with no receiving of human manual assistance.

BACKGROUND ART

Among many of the quadrupedal animals, typified by dogs or cats, that are kept as pets is a trend toward lifespans growing longer compared with the past, due to developments in medicine, similarly as with humans. Nevertheless, there never ceases to be quadrupeds whose limbs are unavoidably debilitated or handicapped owing to illness or injury. For this reason, wheelchairs, harnesses, and the like exist for assisting ambulation of quadrupeds who have debilitation or disability in their limbs.

Wheelchairs for quadrupedal animals, by supporting the trunk with a frame equipped with wheels for assisting ambulation, alleviate the load from the ground acting on disabled forelimbs or hind limbs, enabling quadrupeds having debilitated or handicapped limbs to ambulate. Moving of the hind limbs or forelimbs back and forth rotates the wheels in the direction of travel, making self-willed ambulation possible. Most wheelchairs for quadrupedal animals are wheelchairs furnished with a pair of rear wheels for assisting the hind limbs, but for animals whose forelimbs are debilitated, there are also wheelchairs furnished with a pair of front wheels. Additionally, for cases in which both the forelimbs and hind limbs are debilitated, three-wheeled and four-wheeled wheelchairs exist.

Given that employing a wheelchair enables ambulatory movement despite the limbs being debilitated or handicapped, on the part of quadrupedal animals that use wheelchairs, the benefits presumably are eliminating lack of exercise, alleviating stress due to self-willed ambulation, preventing debilitation of remaining healthy legs, preventing loss of appetite, as well as preventing deterioration of physical condition due to lack of exercise.

Furthermore, inasmuch as by using a quadrupedal animal wheelchair, self-willed ambulation is possible for animals whose limbs are debilitated or handicapped, with there being no need to carry out human manual assistance-including carrying the animal in the arms every time on occasions of travel by taking a walk or the like, lifting it up in order to set its trunk into a harness, or giving it a ride in a buggy that is pushed—the burden on the pet owner is alleviated. Precedent technical literature has been disclosed relating to quadrupedal-animal wheelchairs that have been developed in order to assist when animals whose limbs have debilitation or disability ambulate.

Precedent Technical Literature

PATENT DOCUMENTS

Patent Document 1: Japanese Registered Utility Model Pub. No. 3209674
Patent Document 2: Japanese Patent Pub. No. 5460916

SUMMARY

Issues Invention Is to Address

Patent Document 1 discloses a dog wheelchair that by means of a structure provided with a wheeled mobile section and in which the frame can be folded under, enables a dog to lower its trunk and transition into a sitting position or a prone position. According to Patent Document 1, during an on-all-fours standing position ("standing position" hereinbelow), the wheeled mobile section is immobilized with buckles, wherein ambulation is possible. When the wheel height is to be changed, a person's hands undoing the buckles releases the immobilized state of the wheeled mobile section, whereby the structure in which the frame can be folded under is assumed. This does not mean, then, that quadrupeds themselves may, with no receiving of human manual assistance, transition to a sitting position or a prone position.

Patent Document 2 discloses a wheelchair for quadrupedal animals characterized in that a connecting rod that is directly over the spine is leftward/rightward swivelable at sections where it couples with a traction part and with a support part. According to Patent Document 2, thanks to the coupling sections being swivelable, when the four-legged animal switches direction, the curving of its trunk is not hindered, enabling the quadruped to use the device more comfortably. Nevertheless, inasmuch as the wheel stay is not equipped with a drive mechanism for vertically varying the position of the wheels, transitioning to a sitting position, a prone position, or a standing position with no receiving of human manual assistance is not possible.

With above-cited Patent Document 1 and Patent Document 2 to start with, to date, what has existed as wheelchairs in order to assist ambulation by quadrupedal animals with limb disabilities are those that with the structure of the support part being swivelable, place emphasis on ease of walking, or those that by means of the unique structure of leg support parts and sections that touch the animal's body, alleviate the burden on quadrupedal animals, as well as those that by a person lending a hand, enable an animal's transitioning to a standing position, a sitting position, or a prone position. What has not existed, however, is a wheelchair for quadrupedal animals that enables them to carry out a shift into a standing position, a sitting position, or a prone position without a person's lending a hand. Consequently, on occasions when a four-legged animal's limbs are fatigued from ambulation, the quadruped has not been able of its own volition to shift its posture to a sitting position or prone position to take a rest.

An object of the present invention, brought about taking the above-noted issues into consideration, is to make available a wheelchair for quadrupedal animals that, by furnishing its wheel stay with a drive mechanism for changing the wheel positions, when a four-legged animal with a disability (ies) in the limbs halts ambulation, makes its transitioning into a sitting position as well as a prone position possible and also enables it to transition to a standing position from sitting-position and prone-position states, with no receiving of human manual assistance.

Means for Resolving the Issues

In order to resolve the above-noted issues, a quadrupedal animal wheelchair of the present invention is furnished with: a main frame for supporting a quadrupedal animal; a harness, provided on the main frame, for cradling the trunk of the quadrupedal animal; at least a pair of wheel stays provided on either side of the main frame; wheels provided on the lower ends of the wheel stays; a control unit; a sensor for sensing state of the wheels; and drive mechanisms for changing the position of the wheels in the wheel stays; characterized in that the control unit takes as input and analyzes wheel state sensed by the sensor, determines wheel position according to the wheel state, and commands the drive mechanisms to change the wheel positions.

Also, a quadrupedal animal wheelchair of the present invention may be characterized in that the drive mechanisms are furnished with a structure whereby the wheel-supporting wheel stays extend-contract upward and downward.

A quadrupedal animal wheelchair of the present invention may be characterized in having at the rear end of the main frame a sensor-directed wheel equipped with the sensor.

A quadrupedal animal wheelchair of the present invention may be characterized in that the sensor senses wheel rotational state.

A quadrupedal animal wheelchair of the present invention may be characterized in further being furnished with a sensor for sensing load acting on the wheels or the wheel stays, or on the sensor-directed wheel or a stay for the sensor-directed wheel.

A quadrupedal animal wheelchair of the present invention may be characterized in further being furnished with a sensor for sensing the quadrupedal animal's bearing.

Effects of Invention

A quadrupedal animal wheelchair of the present invention, furnished with a sensor for sensing the state of the wheels, senses rotation of front or rear wheels, transmits to a control unit furnished on the main frame of the quadrupedal animal wheelchair ambulating or halted status of a quadrupedal animal fitted into the wheelchair of the present invention, and changes the wheel position, demonstrating an effect whereby a quadrupedal animal is able to transition into a sitting position or a prone position and a standing position with no receiving of human manual assistance.

A quadrupedal animal wheelchair of the present invention is furnished on the wheel stays with drive mechanisms for changing the wheel positions. When the drive mechanisms sense by means of the sensors that the wheels have halted, they shift the main frame downward allowing, in the case of a wheelchair for supporting the hind limbs, a transition to a sitting position in which the haunches touch the ground. In that situation, flexing the forelimbs allows transitioning to a prone position. The wheels are in a state of continuous contact with the ground; and when the four-legged animal moves its forelimbs and the sensor senses rotation of the wheels, the drive mechanisms are operated to telescope-out the wheel stays, shifting the main frame upward, whereby an effect is demonstrated in which the haunches or the rearward trunk having been in contact with the ground lift up again, enabling a transition into a standing position.

In the case of a wheelchair for supporting the forelimbs, when the sensors detect that load acting on the wheels has grown greater, the drive mechanisms are operated to telescope—in the wheel stays, shifting the main frame downward. In that situation, flexing the hind limbs allows transitioning to a prone position in which the trunk is in contact with the ground. Alternatively, the fact that the haunches are contact with the ground is sensed with the sensors, and the drive mechanism is operated to telescope—in the wheel stays and shift the frame downward, making it possible to transition to a prone position.

According to a quadrupedal animal wheelchair of the present invention, mounting on the rear end of the main frame a sensor-directed wheel in order to attach to it a sensor for sensing wheel rotational state eliminates the necessity of furnishing a sensor on the wheels that assist the limbs, enabling the structure of the wheels to be made simpler and handier, and demonstrating the effect that the quadrupedal animal's ambulation is not interfered with.

MODE(S) FOR EMBODYING INVENTION

Figure 1:
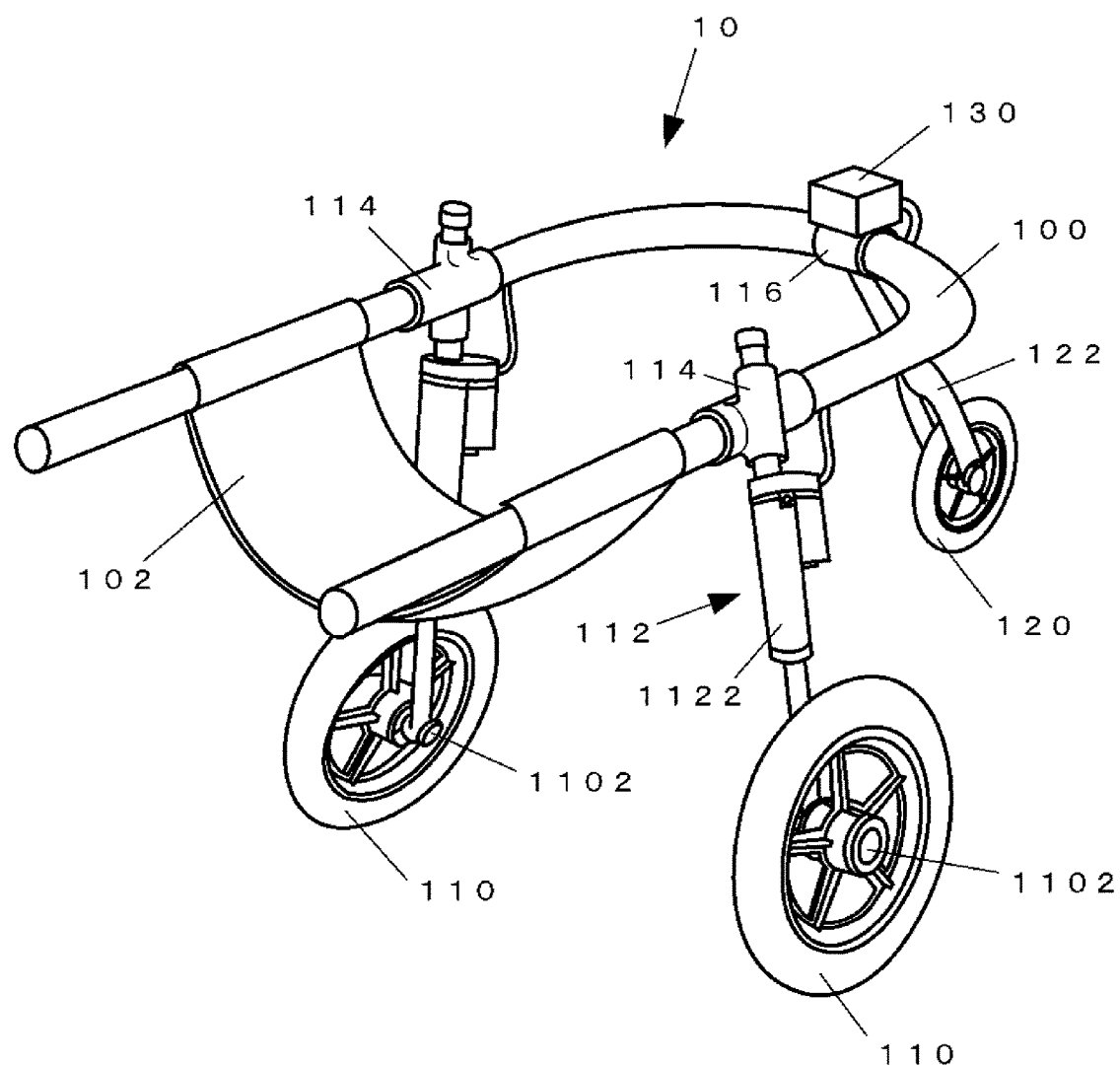
FIG. 1 is a perspective diagram illustrating a quadrupedal animal wheelchair (hind-limb-directed) 10 involving the present invention.

Referring to the drawings, a description of a mode for embodying a quadrupedal animal wheelchair involving the present invention will be made. In the present embodying mode, to begin with, a description relating to a quadrupedal animal wheelchair (hind-limb-directed) 10, with the limbs requiring wheeled assistance being hind limbs, will be made. FIG. 1 is a perspective view representing a quadrupedal animal wheelchair (hind-limb-directed) 10 involving the present invention. The quadrupedal animal wheelchair (hind-limb-directed) 10 involving the present invention comprises at least: a main frame 100; a harness 102, provided on the main frame 100, for cradling the trunk of a quadrupedal animal AN from underneath; a pair of wheel stays 112 provided on either side of the main frame 100 in the vicinity of the limbs requiring wheeled assistance; wheels 110 attached to the lower ends of the wheel stays 112 via axles 1102; a sensor for sensing state of the wheels 110;

a control unit 130; and a drive mechanism 1122 for changing the position of the wheels 110 in the wheel stays 112.

The main frame 100 illustrated in FIG. 1 is disposed to stretch along either side of the trunk lateral portions of the quadrupedal animal AN.

The harness 102 is a girdle-like component provided suspended, by means of a flexible material, across the main frame 100 interval between the trunk-lateral-portion sides, and can detachably/reattachably support the trunk of the quadrupedal animal AN. The harness 102 may be of form that further laps around the upper side of the trunk to more firmly support the trunk. It also may be in a form in which it covers the entire trunk lower side, opened with holes for the limbs only. Suitable materials for it include genuine leather, synthetic leather, and fabric.

The forms of the main frame and the harness are not limited to those described above; the main frame may be in the form of a single rod that stretches along the backbone, and the harness may be attached to the main frame so that it wraps around the trunk periphery to support it. They may be in other forms as long as wheel movement by means of the drive mechanisms 1122, which are described below, is not obstructed.

Figure 2:
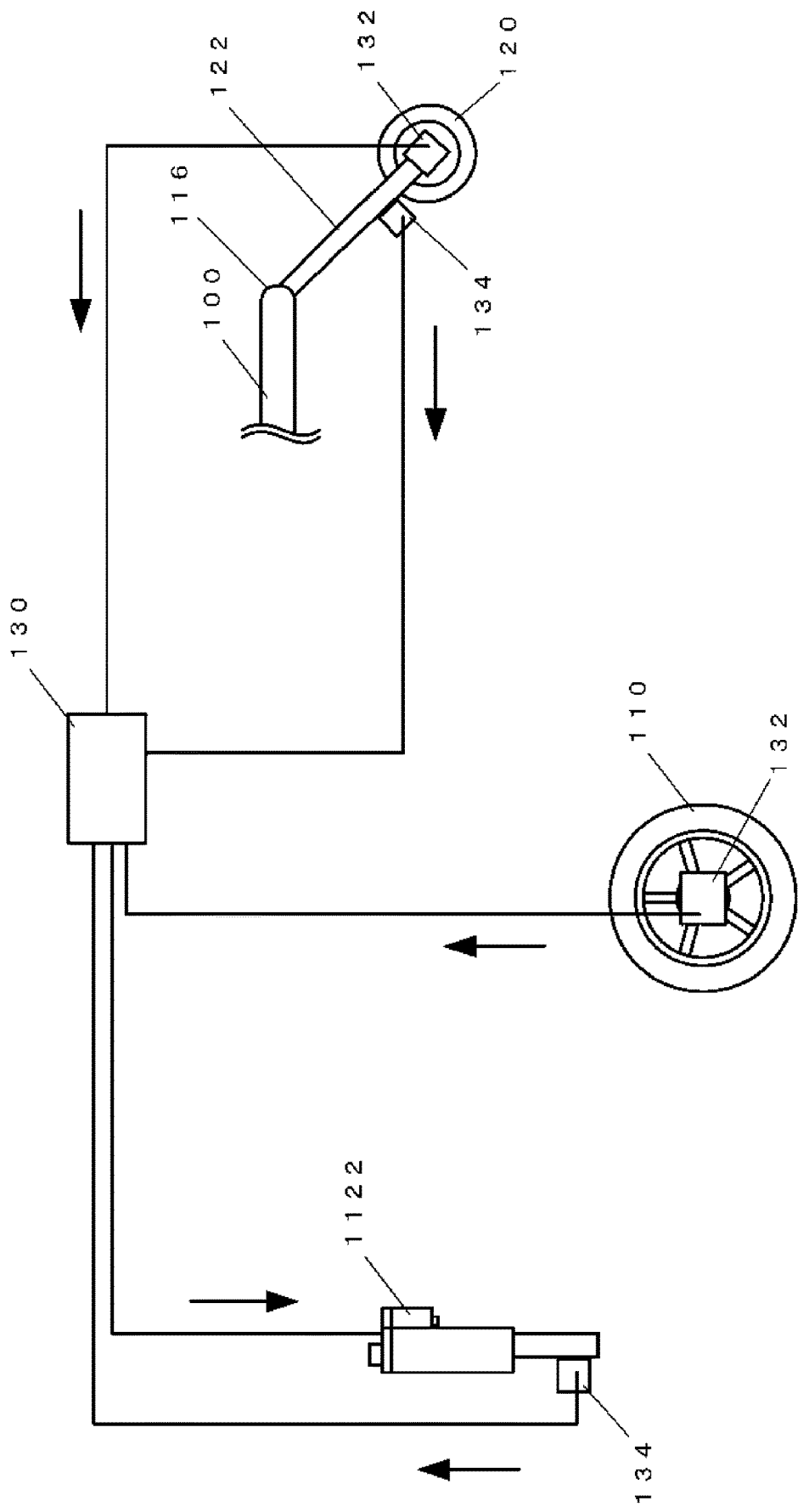
FIG. 2 is a single—example block diagram of control in a quadrupedal animal wheelchair involving the present invention.

As to a sensor for sensing rotating or halted state of the wheels 110, utilized is a known sensor, such as a proximity sensor or an angular rate sensor 132 (FIG. 2 is referred to), that may detect that the wheels 110 are rotating. With a proximity sensor, a method in which a plurality of metal chips affixed to the wheels 110 is sensed can be applied. Furthermore, the angular rate sensor 132, exemplified by detector types routinely employed in situations in which automobile wheel speed is measured, can be attached to the axle(s) 1102.

Alternatively, as illustrated in FIG. 1, instead of directly attaching the angular rate sensor 132 to the wheels 110 that assist the limbs, a sensor-directed wheel 120 may be attached to the rear end of the main frame 100, and the angular rate sensor 132 may be attached to the sensor-directed wheel 120. The sensor-directed wheel 120 is mounted, via a sensor-directed-wheel stay 122, free to shift perpendicularly with respect to the main frame 100 so as not to prevent the quadrupedal animal AN from assuming a sitting-position or prone-position posture. Separately providing the sensor-directed wheel 120 onto which the angular rate sensor 132 is mounted can serve to simplify the structure of the limb-assisting-wheel 110 surroundings. In this case, given that it is not necessary for the sensor-directed wheel 120—as long as, with it in a grounded state in which it is urged against the earth/floor, the angular rate sensor 132 may detect operation of the wheelchair—to support the quadrupedal animal AN, a simple structure allowing it, following on operations of the wheel stays 112, to ground itself against the earth/floor is sufficient.

FIG. 2 shows one example block diagram of control in a quadrupedal animal wheelchair involving the present invention. The angular rate sensor 132 is attached to a wheel 110 or the sensor-directed wheel 120. Further, attached to a wheel stay 112 (see FIG. 1) or the sensor-directed-wheel stay 122 is a load sensor 134 for detecting load from the ground/floor. The control unit 130 takes as input a signal from the angular rate sensor 132 or the load sensor 134, and in order to change the position of the wheels 110 in the wheel stays 112, outputs a signal to the drive mechanisms 1122 provided on the wheel stays 112.

For example, the control unit 130 takes as input a signal detected by the angular rate sensor 132, analyzes the state of the wheel 110 or the sensor-directed wheel 120, determines a rotating or halted state of the wheels 110, and selects whether to switch to either a sitting-position mode or an ambulation mode. Subsequently, in order that the wheels 110 are shifted to the wheel position of the selected mode, it outputs an operation signal to the drive mechanisms 1122.

A portion of the wheel stays 112 is constituted by the drive mechanisms 1122, with the wheel-stay upper end sections being fixed to the main frame 100 by means of couplers 114, while on their lower end sections, the wheels 110 are rotatably mounted via the axles 1102. The drive mechanisms 1122 change the wheel positions in the wheel stays 112, on the basis of a signal for operating the wheels into the position of the mode selected in the control unit 130.

As drive mechanisms 1122 in a quadrupedal animal wheelchair (hind-limb-directed) 10 for assisting the hind limbs, one example employs linear actuators 1122 that extend-contract the length of the wheel stays 112 up and down when the rotation of the wheels 110 is halted or started. When halting of the wheels 110 is sensed by the sensor, the wheel stays 112 are contracted by the linear actuators 1122, and with the wheels 110 being grounded as they are, the main frame 100 shifts downward, approaching the ground/floor, allowing the haunches to transition to a grounded sitting position. In that situation, flexing the forelimbs allows transitioning to a prone position. With the wheels 110 in a continuously grounded state, when the quadrupedal animal AN moves its forelimbs and the sensor senses rotation of the wheels 110, the wheel stays 112 telescope out and the main frame 100 shifts upward, enabling the haunches that had been grounded to be uplifted again and transition to a standing position.

Figure 3:
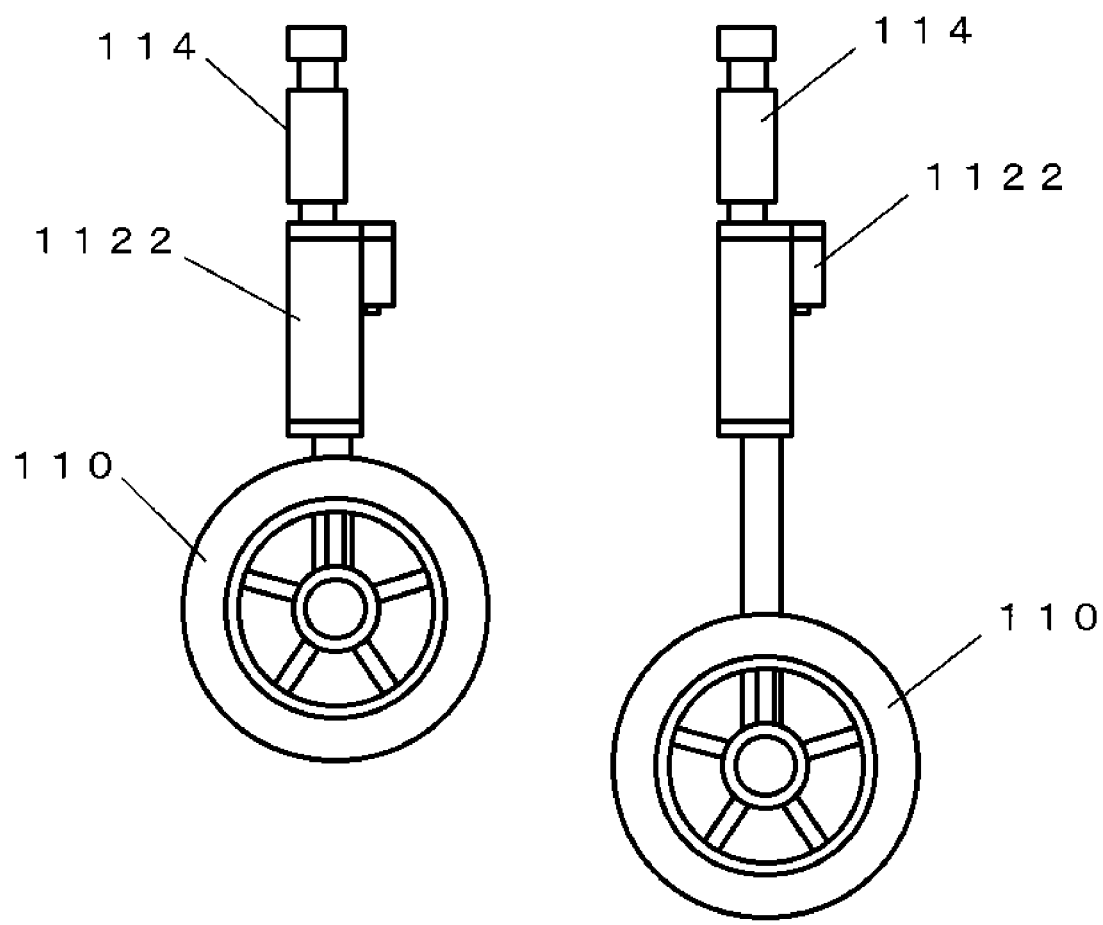
FIG. 3 is diagrams illustrating operation of a linear actuator 1122.

As for the linear actuators 1122, there are devices that convert the rotational motion of a stepping motor into linear motion by means such as a rack and pinion or ball screw, devices that utilize air pressure or hydraulic pressure to cause linear movement, and devices that cause linear movement by means of a linear motor. FIG. 3 is a diagram illustrating operation of a linear actuator 1122. Employing the linear actuators 1122 enables the wheel position in the wheel stays 112 to be shifted in the directions of the axis along which the linear actuators 1122 telescope, that is, up and down with respect to the ground/floor. For the motive power source for the linear actuators 1122, storage batteries or dry-cell batteries can be employed. Even also in implementations exploiting pneumatic pressure, a known compressor with the motive power source being storage batteries or dry batteries can be employed.

The wheels 110 shift in the directions of the axis along which the linear actuators 1122 telescope, yet, owing to the quadrupedal animal AN being debilitated or disabled in its hind limbs, the wheels 110 will be continuously grounded under gravity against the ground/floor. This means as a result that the extending and contracting of the linear actuators 1122 changes the height of the main frame 100 with respect to the ground/floor.

As stated earlier, it is also possible to shift the position of the wheels in the wheel stays 112 on the basis of the sensor-directed wheel 120 rotational speed transmitted to the control unit 130 from the angular rate sensor 132 attached to the sensor-directed wheel 120. In the same way as with implementations in which an angular rate sensor 132 is mounted on a wheel 110, when rotation of the sensor-directed wheel 120 has halted or started, by the linear actuators 1122 of the wheel stays 112 contracting/extending and thereby shifting the wheels 110 in the directions of the axis along which the linear actuators 1122 telescope, the height of the main frame 100 with respect to the ground/floor is changed.

Figure 4:
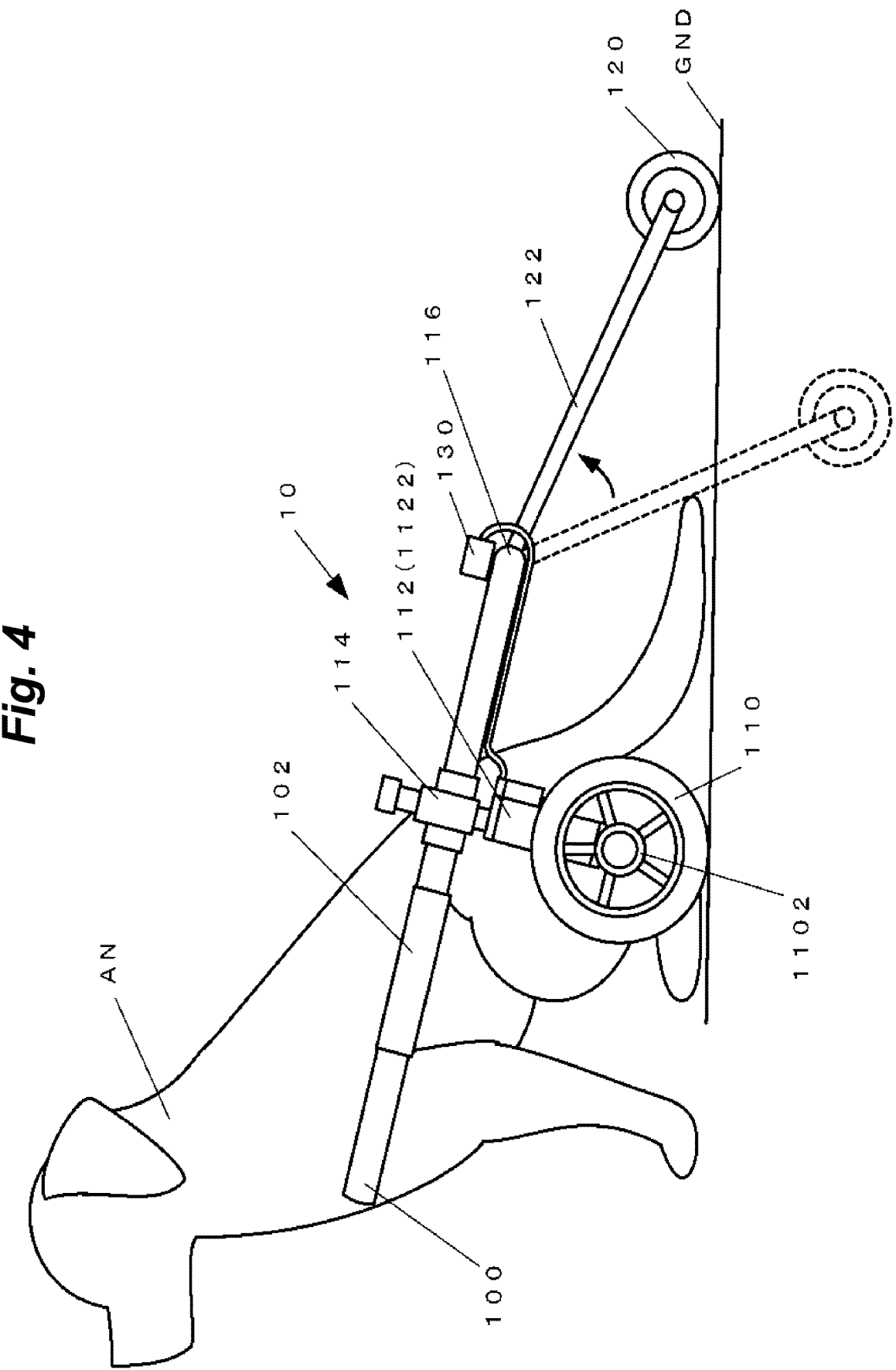
FIG. 4 is a diagram illustrating a state (sitting position) in which the quadrupedal animal wheelchair (hind-limb-directed) 10 involving the present invention is being used.

In FIG. 4, the sensor-directed-wheel stay 122 that supports the sensor-directed wheel 120 is coupled to the main frame 100 to let the stay turn up and down with respect to the perpendicular. Under gravitational force, the sensor-directed wheel 120 is in continuous contact with the ground/floor. Also, the structure may be one in which by means of an elastic component or an urging component, the main frame 100 and the sensor-directed-wheel stay 122 are coupled in a way such as to be urged toward the ground/floor. Following on the operation of the linear actuators 1122, and while maintaining a state in which the sensor-directed wheel 120 is grounded against the ground/floor, the sensor-directed-wheel stay 122, varying its angle with respect to the main frame 100, is able to flexibly alter orientation so as not to get in the way of the quadrupedal animal AN altering its posture to a sitting position or a prone position.

The coupling between the main frame 100 and the sensor-directed-wheel stay 122 may be other than rotating. It may be a structure whereby utilizing an elastic component, the sensor-directed-wheel stay 122 slides in the interior of a cylindrical member provided on the main frame 100.

Even by employing, apart from linear actuators, rotary actuators that are of structure whereby the wheel stays are folded, the drive mechanisms can yield similar effects since the wheels 110 can be shifted in a direction in which they approach the main frame 100, and meanwhile the main frame 100 can be shifted in a direction in which it approaches the ground/floor.

Figure 5:
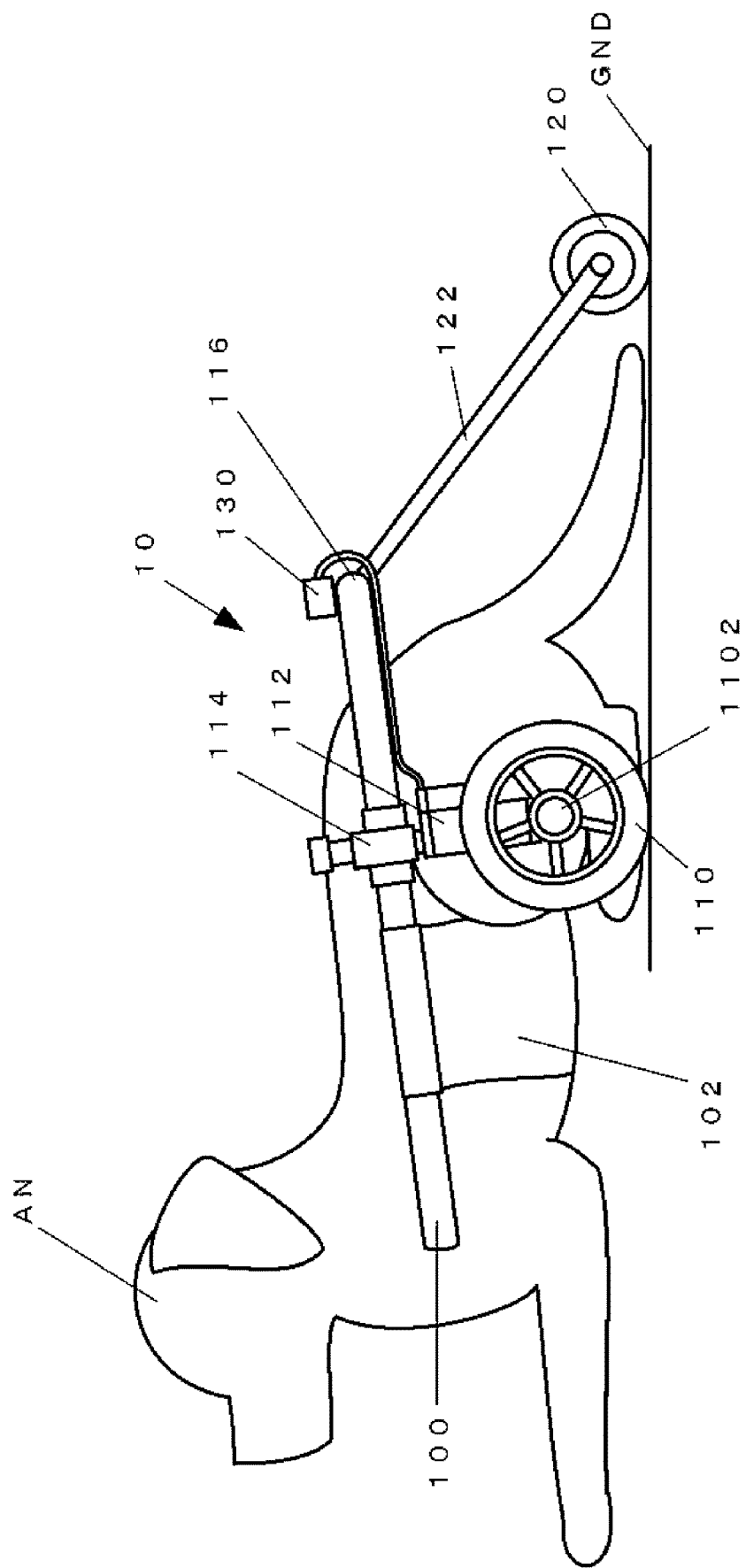
FIG. 5 is a diagram illustrating a state (prone position) in which the quadrupedal animal wheelchair (hind-limb-directed) 10 involving the present invention is being used.

Telescoping—in of the wheel stays 112 by operation of the linear actuators 1122 can be determined by the angular rate sensor 132 sensing rotational halting of the wheels 110 or their rotational speed being below a predetermined value, and the control unit 130 taking as input a signal that indicates that the wheels 110 having been sensed by the angular rate sensor 132 are halted or their rotational speed is below a predetermined value. Subsequent to determination of telescoping—in of the linear actuators 1122, in an implementation, for example, in which they are linear actuators 1122 utilizing a stepping motor, by the outputting to the stepping motor of a signal that causes the linear actuators 1122 to rotate in the telescoping—in direction, the wheel stays 112 telescope—in, enabling the quadrupedal animal AN employing the quadrupedal animal wheelchair (hind-limb-directed) 10 to transition to the sitting-position or prone-position mode illustrated in FIG. 4 or FIG. 5.

Also, controlling the linear actuators 1122 by utilizing a sensor that senses only whether or not the wheels 110 are rotating is also possible. Specifically, the presence of metal chips is detected with a proximity sensor, and if the proximity sensor repeatedly turns on and off, the wheels 110 are judged to be in a rotational state, whereas if the sensor continues being on or being off, the wheels 110 are judged to be in a halted state. In this case, since the proximity sensor might repeatedly turn on and off due to minute reciprocating motion of the wheels 110, misidentifying them as being in a rotational state, it is necessary to set up a insensitive period to prevent misidentification. If the wheels 110 are in a rotational state, the linear actuators 1122 are telescoped out, while if the wheels 110 are in a halted state, the linear actuators 1122 are telescoped in.

In this case, providing a sensor that senses grounding load acting on the wheels 110 is ideal in that it enables the grounding status of the wheels 110 to be recognized, and when the grounding load has fallen below a predetermined value, a control process to be carried out that halts the telescoping—in operation of the linear actuators 1122. With a state in which a moderate load acts on the wheels 110 being maintained, and with large load due to body weight on the debilitated limbs of the quadrupedal animal AN being alleviated, assisting operation of the limbs proves possible.

The sensor for sensing loads is exemplified by a load cell 134, but is not limited to this; any well-known load sensor 134 may be used. The load cell 134 is situated on the axle 1102 or in proximity to the part of a wheel stay 112 where a wheel 110 is mounted, and from the load cell 134 a voltage signal is input into the control unit 130, which, when the value of the voltage has fallen below a predetermined value that is established in advance, determines that the telescoping—in operation of the linear actuators 1122 is to be halted and outputs a stepping-motor halt signal to the linear actuators 1122.

When the quadrupedal animal AN transitions to ambulating, the angular rate sensor 132 senses the rotation of the wheels 110 produced by the quadrupedal animal AN carrying out a forward body-weight movement, and the rotational speed sensed by the angular rate sensor 132 is taken as input by the control unit 130, which determines that the linear actuators 1122 are to be telescoped out. In an implementation, for example, with linear actuators 1122 utilizing a stepping motor, in order to shift the wheels 110 to the lower-end position (ambulation mode) a signal for rotation in the direction in which the linear actuators 1122 telescope out is output to the stepping motor. The wheel stays 112 are thereby telescoped out, with the quadrupedal animal AN employing the quadrupedal animal wheelchair (hind-limb-directed) 10 transitioning to the standing position illustrated in FIG. 6.

Figure 7:
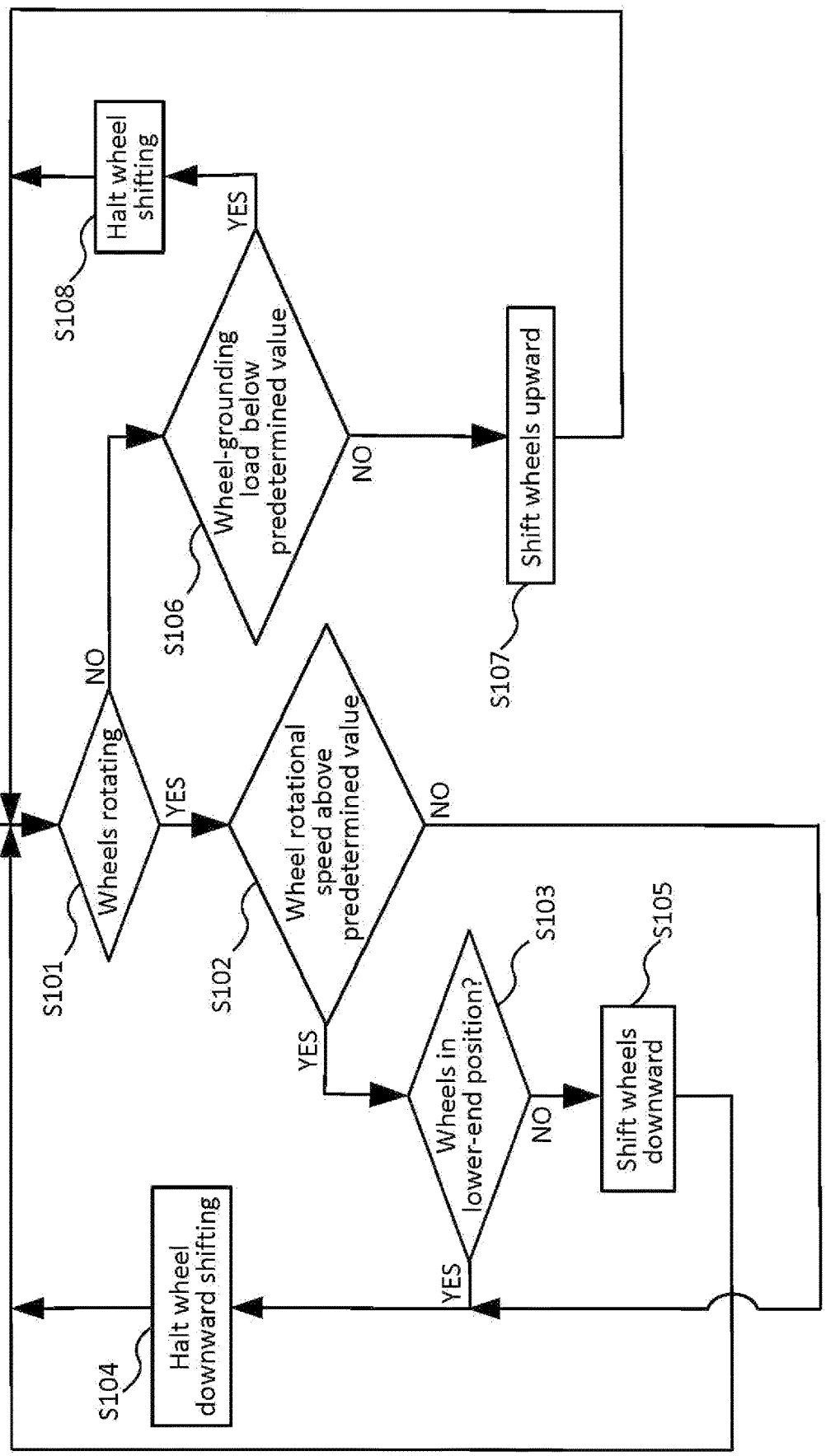
FIG. 7 is a flowchart representing control of the quadrupedal animal wheelchair (hind-limb-directed) 10 involving the present invention.

As to transitioning between the sitting-position mode and the ambulation mode in the quadrupedal animal wheelchair (hind-limb-directed) 10, a specific-instance flowchart is presented in FIG. 7. To begin with, an input signal from the angular rate sensor 132 is utilized to judge whether or not the wheels 110 are rotating (Step 101; hereinafter "step" is denoted "S"). If they are judged to be rotating, the process proceeds to S102 to further judge whether the rotational speed of the wheels 110 is above a predetermined value. If due to the quadrupedal animal AN advancing the rotational speed is confirmed to be above the predetermined value, the process proceeds to S103.

In S103, the wheel position is checked through a stepping-motor encoder value or a position-detection sensor. In a situation where the wheels 110 have already telescoped out and are in the lower-end position, the rotation of the stepping motor is halted (S104), whereas if the wheels 110 are not in the lower-end position, a signal so that the stepping motor will rotate in the direction in which the linear actuators 1122 telescope out is output (S105).

In S102, if the rotational speed is judged to be under the predetermined value, the process proceeds to S104, at which a halt signal is output to the stepping motor to halt operation of the linear actuators 1122. Since it can happen that, due to minute reciprocating motion of the wheels 110 from, among other things, the quadrupedal animal joggling its body, the sensor misidentifies the wheels 110 as being in a rotational state, it is necessary to set up a non-sensing speed range.

On the other hand, in an implementation in which a sensor for sensing loads is furnished, and in S101 rotation of the wheels 110 has not been confirmed, the process proceeds to S106, at which it is judged based on the voltage signal from the load cell 134 whether the grounding load acting on the wheels 110 is below a predetermined value. Once a quadrupedal animal AN with debilitated or disabled hind limbs deposits its weight in the harness 102 on the main frame 100, the grounding load on the wheels 110 grows larger. It is preferable that a grounding-load threshold be preestablished, so that in instances in which the grounding load has increased to above the predetermined value, transitioning to the sitting position takes place. In those situations, the wheel stays 112 being telescoped—in shifts the wheels 110 upward in the wheel stays 112; yet because the wheels 110 are continuously grounded, the main frame 100 shifts downward, grounding the haunches of the quadrupedal animal AN (S107). In instances where the quadrupedal animal AN is already in a sitting-position state, its haunches are grounded, wherein the grounding load on the wheels 110 is reduced. If the grounding load has gone below a predetermined value, the wheels 110 halt shifting in their telescoping—in direction in the wheel stays 112 (S108). This is optimal in that thereby, with no shifting the wheels 110 an unnecessarily long distance, in transitioning to ambulation, the movement of the wheels 110 to the lower-end position can be minimized, making it possible to impart an immediate responsiveness.

Embodiment Example 1

Figure 8:
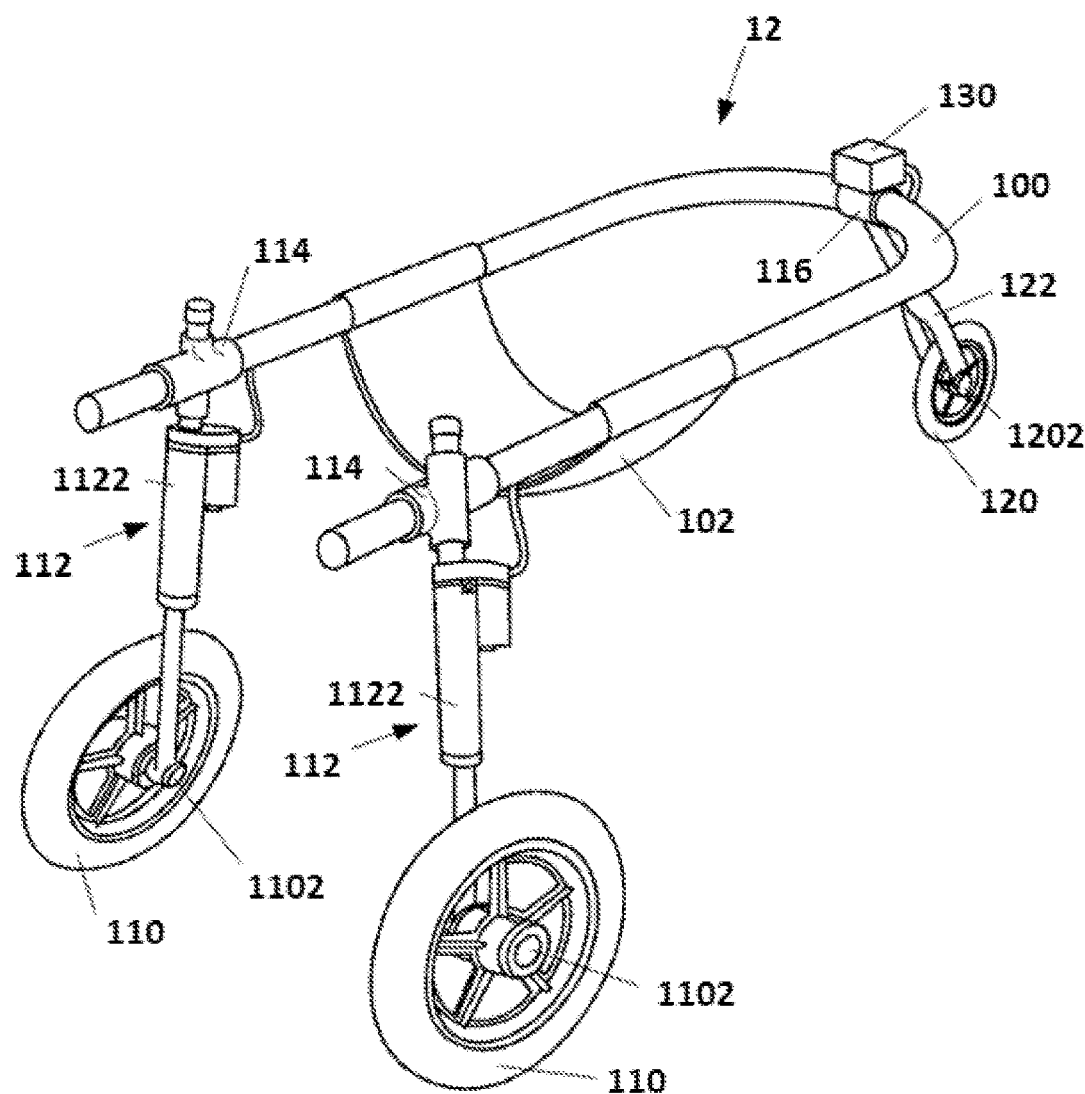
FIG. 8 is a perspective diagram illustrating a quadrupedal animal wheelchair (forelimb-directed) 12 involving the present invention.

With the foregoing embodying mode, a two-wheeled quadrupedal animal wheelchair (hind-limb-directed) 10 furnished with wheels 110 supported on a pair of wheel stays 112 beneath either rear-end-proximate side of a main frame 100, in a situation in which hind-limb assisting wheels 110 are necessary, was described. Meanwhile, situations exist in which the forelimbs are debilitated or disabled, and forelimb-assisting wheels 110 are necessary. A two-wheeled quadrupedal animal wheelchair (forelimb-directed) 12 for assisting the forelimbs is furnished with wheels 110 supported on a pair of wheel stays 112 beneath either front-end-proximate side of the main frame 100, as illustrated in FIG. 8.

In cases in which the forelimbs are debilitated or disabled, the quadrupedal animal wheelchair (forelimb-directed) 12 switches between a prone-position mode and an ambulation mode. If the hind limbs are not debilitated nor disabled, the fact that flexing or extending of the hind limbs can be carried out under the quadrupedal animal AN's own volition makes it possible to have the sitting-position mode and the ambulation mode be identical (in Embodiment Example 1, this mode will be referred to as the ambulation mode). Switching between modes in the quadrupedal animal wheelchair (forelimb-directed) 12 is not dependent on whether the quadrupedal animal is ambulating and the wheels 110 are rotating; rather, it is dependent on the state of the hind limbs. In a situation where the hind limbs are extended, inasmuch as flexing the forelimbs to assume a prone position is not natural, the wheelchair must be in the ambulation mode with the wheel stays 112 telescoped out. On the other hand, in a situation where the hind limbs are flexed, two states, the sitting position and the prone position, are present.

Figure 9:
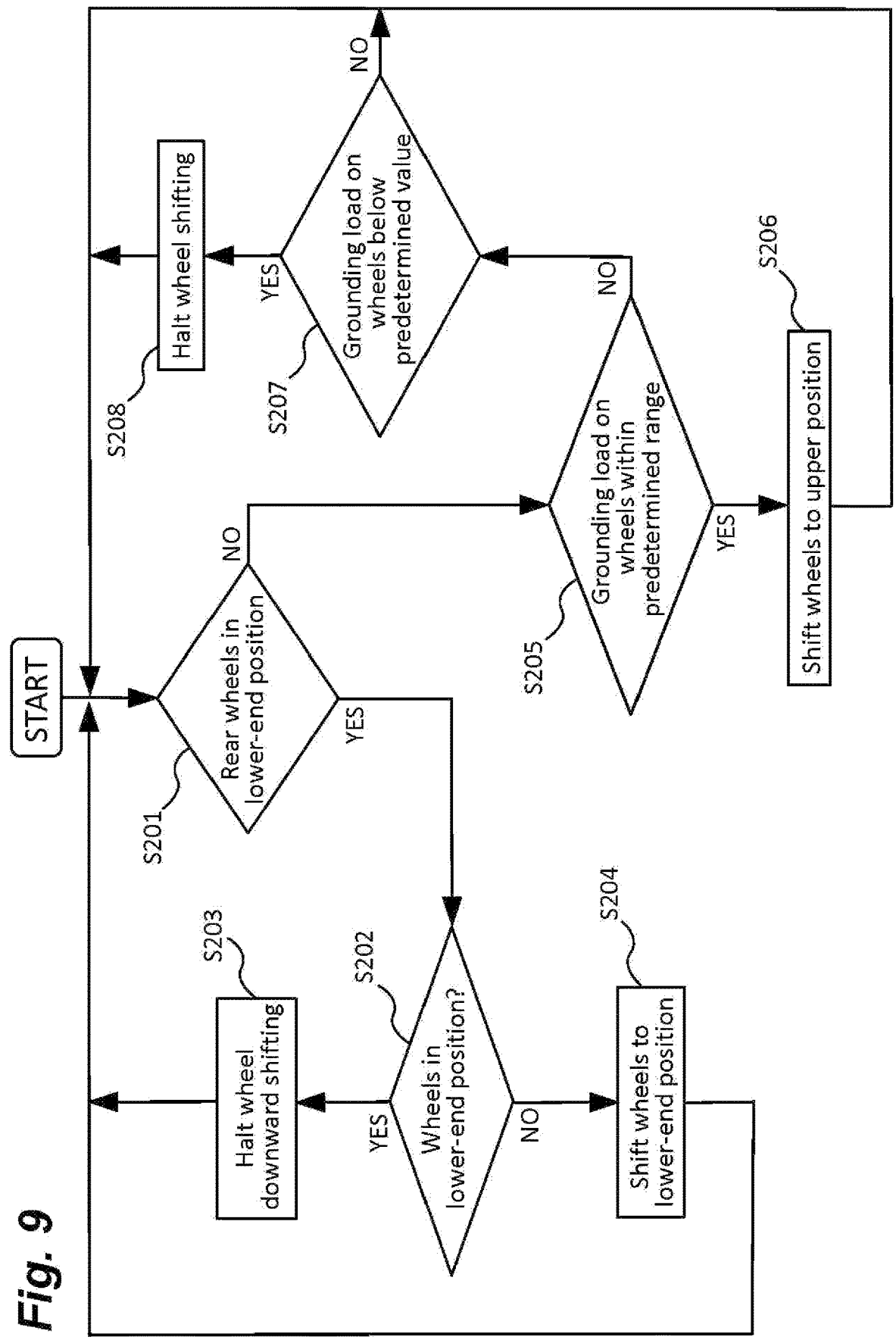
FIG. 9 is a flowchart representing control of the quadrupedal animal wheelchair (forelimb-directed) 12 involving the present invention.

As to switching between the prone-position mode and the ambulation mode in the quadrupedal animal wheelchair (forelimb-directed) 12, a specific-instance flowchart is presented in FIG. 9. To begin with, whether the hind limbs of the quadrupedal animal AN are extended (S201) is judged. Providing a sensor for sensing the grounding load acting on the wheels 110 enables the grounding state of the wheels 110 to be recognized so that whether or not the hind limbs of the quadrupedal animal AN are extended can be judged. When the hind limbs are legs-erect, the load acts on the animal's forelimb end. In cases in which the forelimbs are debilitated or disabled, since the load acting on the forelimbs will be received by the wheel stays 112, measuring this load enables judging whether the hind limbs are legs-erect. The sensor for sensing the load is exemplified by, but not limited to, the load cell 134.

The load cell 134 is situated on the axle 1102 or in proximity to a mounting section between a wheel stay 112 and a wheel 110, and from the load cell 134 a voltage signal is input into the control unit 130, whereby it is judged whether the voltage is below a predetermined value that has been established beforehand. Once a quadrupedal animal AN with debilitated or disabled forelimbs puts its hind limbs legs-erect and deposits its weight in the harness 102 of the main frame 100, the grounded load on the wheels 110 increases. A grounding-load threshold may be preestablished, so that instances in which the grounding load has grown greater than the predetermined value may be judged to be legs-erect. If the hind limbs are legs-erect, the process proceeds to S202.

Figure 6:
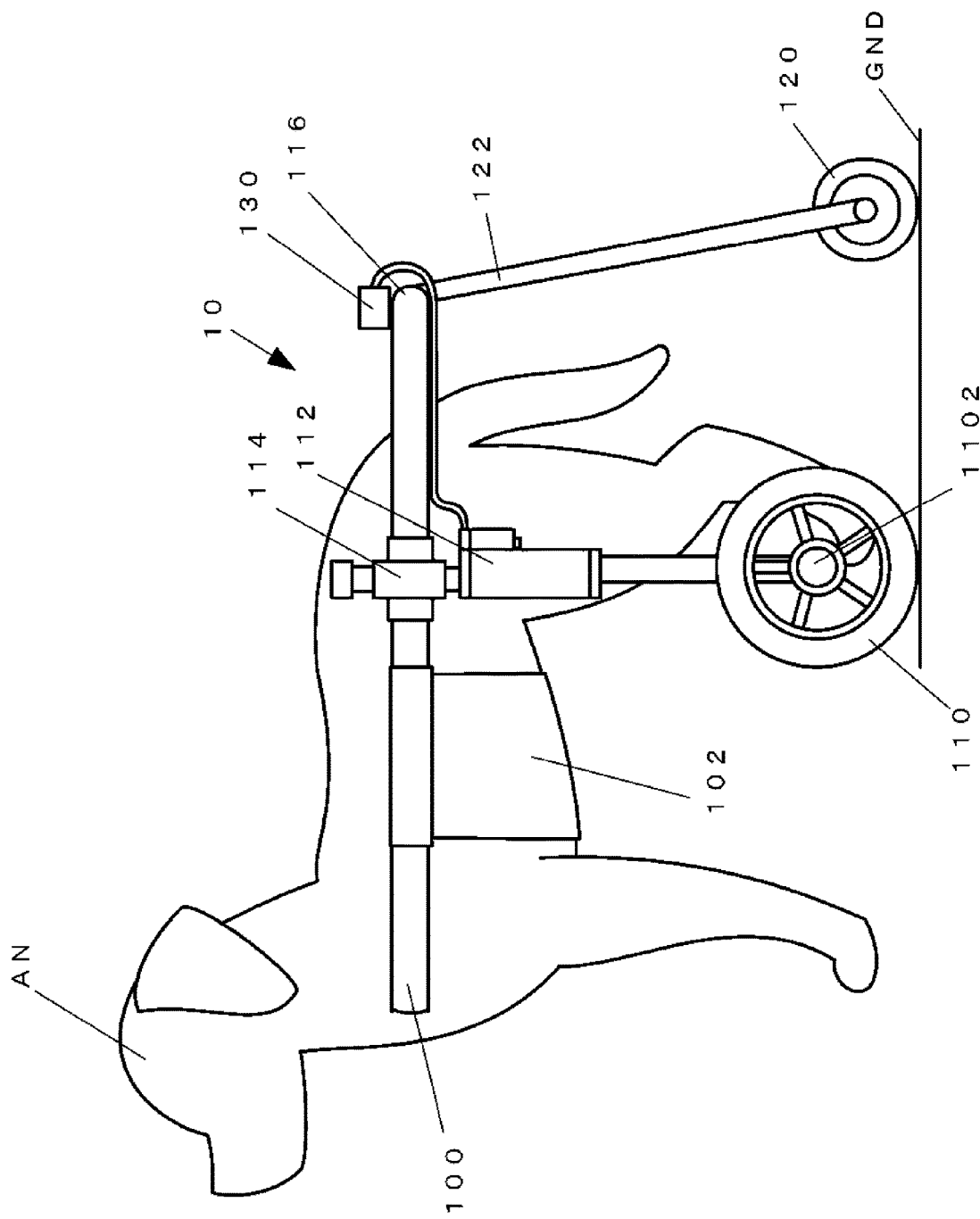
FIG. 6 is a diagram illustrating a state (standing position) in which the quadrupedal animal wheelchair (hind-limb-directed) 10 involving the present invention is being used.

With the load cell 134 situated on the axle 1202 of the sensor-directed wheel 120 or on a coupler 116 between the main frame 100 and the sensor-directed-wheel stay 122, and the load acting on the load cell 134 from the ground/floor being sensed, the judgment as to whether the hind limbs are legs-erect can be made also according to the magnitude of the load. When the quadrupedal animal AN leg-crouches its hind limbs to be in a sitting or prone posture, the load received from the ground/floor acting on the load cell 134 attached to the sensor-directed wheel 120 increases (FIG. 4 is referred to). On the other hand, when it is in a standing position, with the hind limbs legs-erect, the load received from the ground/floor acting on the load cell 134 decreases (FIG. 6 is referred to). With respect to the load, a predetermined threshold value is established to judge whether or not the hind limbs are legs-erect.

Alternatively, situating a limit switch on the coupler 116 between the main frame 100 and the sensor-directed-wheel stay 122, and setting the limit switch so that it will go into its on state, and sense, when the hind limbs are leg-crouched, grounding the haunches against the ground/floor, also enables the judgment as to whether the hind limbs are legs-erect. Furthermore, as a different method of judging whether or not the hind limbs are legs-erect, with an angular rate sensor situated on the coupler 116, rotatably connected to the main frame 100, for the sensor-directed-wheel stay 122, it may be carried out by measuring the rotational angle.

In S202, the position of the wheels 110 is checked. In a situation where the wheels 110 are already in their lower-end position, rotation of the stepping motor is halted (S203), while when the wheels 110 are not in their lower-end position, a signal is output so that the stepping motor rotates in the direction in which the linear actuators 1122 telescope out (S204).

In implementations in which a sensor for sensing loads is provided, and in S201, with the hind limbs of the quadrupedal animal AN not being legs-erect but flexed (sitting or prone-position state), the process proceeds to step S205 to check whether the grounding load on the wheels 110 is within a predetermined-value range. In a situation where a quadrupedal animal AN having disabled forelimbs, employing the quadrupedal animal wheelchair (forelimb-directed) 12 to transition from a sitting-position state to a prone-position state, puts its body weight on the front-wheel end, the grounding load on the wheels 110 will increase. Nevertheless, it will not be as large as the load acting on the front wheels when the hind limbs are in a legs-erect state. Accordingly, when the load is within the predetermined-value range, telescoping—in the wheel stays 112 for transitioning into the prone position shifts the main frame 100 in a ground/floor-ward direction (S206). If the quadrupedal animal AN is already in a prone-position state and the wheel stays 112 have been telescoped in, because its entire trunk is grounded, the grounding load on the wheels 110 will be less than a predetermined value (S207). In this case, shifting of the wheels 110 in the direction in which the wheel stays 112 telescope in is halted (S208).

And in implementations furnished with a limit switch for making a judgment as to whether or not the hind limbs are legs-erect, in a situation where the limit switch is in its on state, for transitioning into the prone position, the main frame 100 may be shifted in a ground/floor-ward direction by telescoping in the wheel stays 112.

Embodiment Example 2

Figure 10:
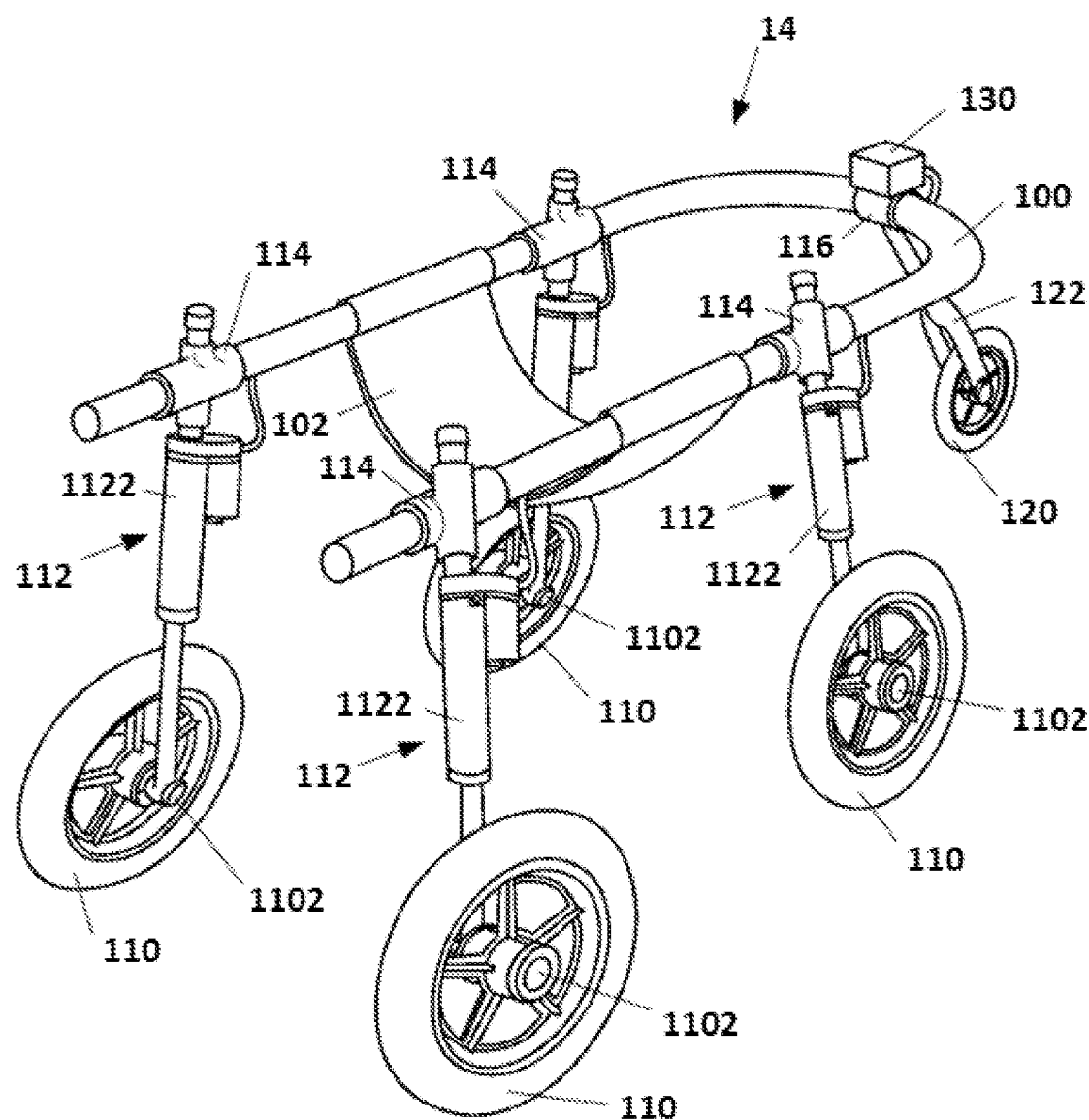
FIG. 10 is a perspective diagram illustrating a quadrupedal animal wheelchair (all-fours-directed) 14 involving the present invention.

Furthermore, cases exist in which, with the four limbs being debilitated or handicapped, wheels 110 for assisting the four limbs are required. A four-wheeled quadrupedal animal wheelchair (all-fours-directed) 14 for assisting the four limbs, as illustrated in FIG. 10, is furnished with wheels 110 supported on respective pairs of wheel stays 112 beneath the front part and the rear part of the main frame 100 in proximity to either end.

In the quadrupedal animal wheelchair (all-fours-directed) 14, if relative to the hind limbs debilitations or disabilities in forelimbs are slighter, it is preferable that in a standing-position state the front wheels be not grounded but slightly floated. The front wheels being grounded would be an interference with motion of the forelimbs, hindering advancement, but by being slightly floated, they do not interfere with movement of the forelimbs; what is more, when the forelimbs are fatigued, grounding the front wheels enables an ambulation assist to be performed. With the rear wheels shifting in the direction in which the wheel stays 112 telescope in, and the quadrupedal animal AN in a state in which it has assumed a sitting position, the front wheels are grounded by the force of the forelimbs pressing on the ground/floor decreasing. At that time, the fact that the load acting on the front wheels has increased is sensed by the load cell 134, converted into an electrical signal, and output to the control unit 130. The control unit 130 then commands the linear actuators 1122 of the front wheels to retreat, whereby the front wheels shift in the direction in which the wheel stays 112 telescope in, lowering the animal's trunk and enabling its transition to the prone position. In the animal's transitioning from the prone position to an ambulation posture, it extends its forelimbs, thereby extending the linear actuators 1122 in the wheel stays 112 and shifting the front wheels to their lower-end position, in which in a sitting-position state is assumed. Thereafter, by the rear wheels rotating due to advancing movement of the quadrupedal animal AN, the wheel stays 112 for the rear wheels telescope out, transitioning the animal into a standing-position state.

Figure 11:
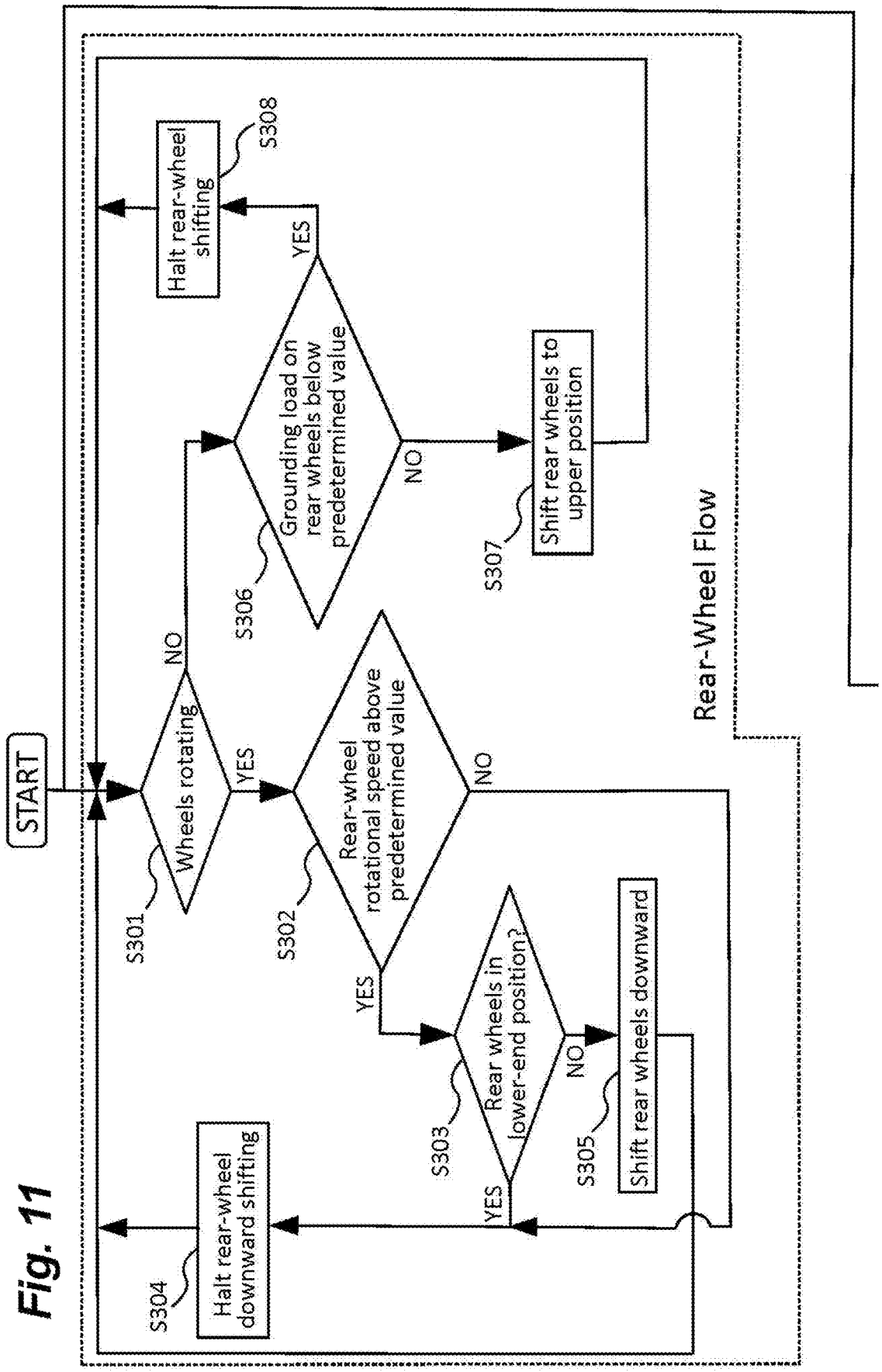
FIG. 11 is a flowchart representing control of the quadrupedal animal wheelchair (all-fours-directed) 14 involving the present invention, wherein it should be understood that the first sheet, labelled "Rear-Wheel Flow," is a counterpart of FIG. 7, with steps S302 through S308 corresponding to steps S101 through S108, and the second, continuation sheet, labelled "Front-Wheel Flow," is a counterpart of FIG. 9, with steps S309 through S316 corresponding to steps S201 through S208.
Figure 11:
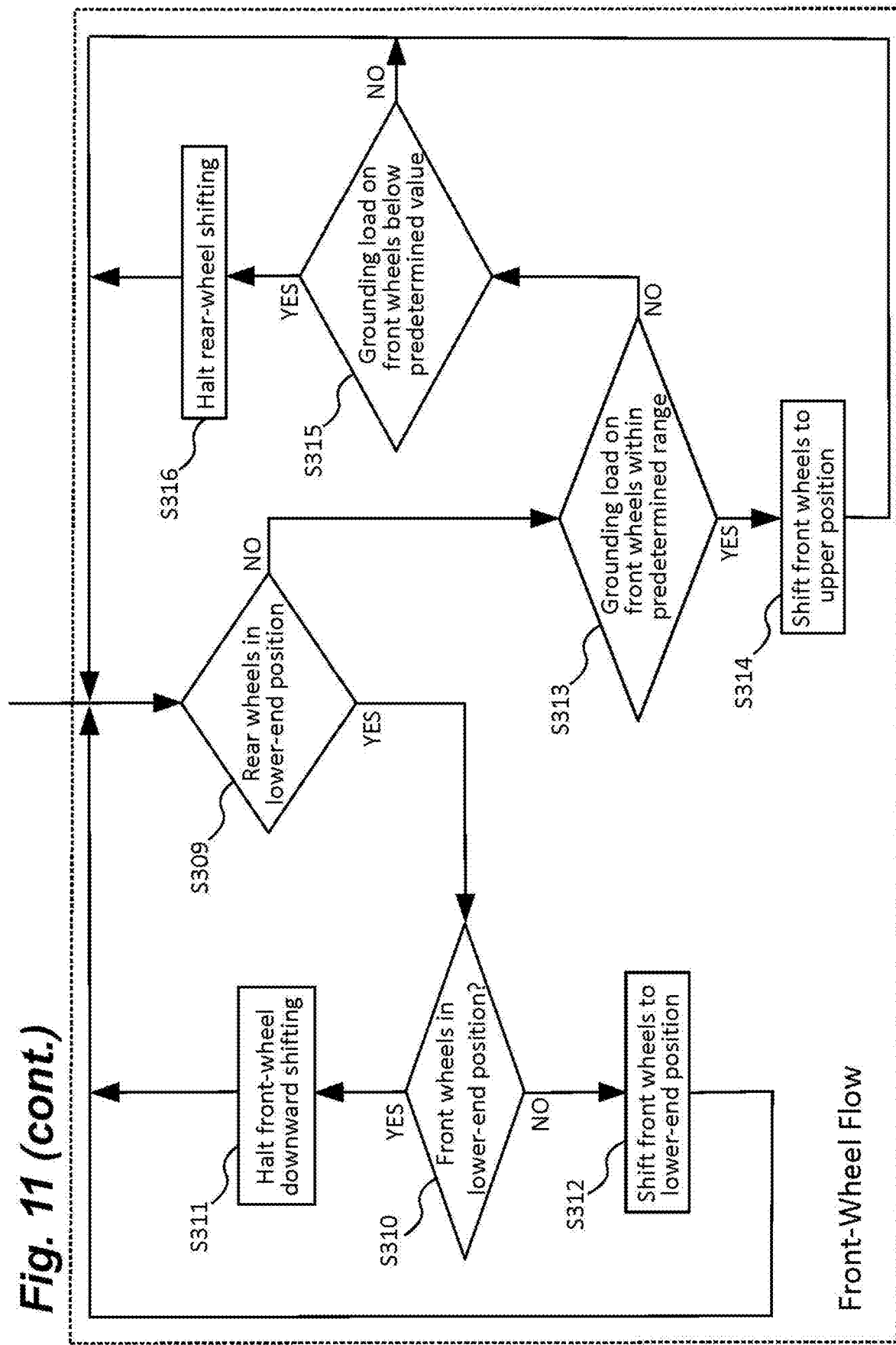

As to switching between the ambulation mode and the sitting-position mode, and between the sitting-position mode and the prone-position mode in the quadrupedal animal wheelchair (all-fours-directed) 14, a specific-instance flowchart is presented in FIG. 11. In relation to shifting of the rear wheels, in the same way as with the flow in the case of the quadrupedal animal wheelchair (hind-leg-directed) 10, in response to rotation of the rear wheels and their rotational speed, the rear wheels shift in the telescoping—in direction or the telescoping-out direction of the wheel stays 112. Also, with the front wheels as well, the flow is generally the same as with the case of the quadrupedal animal wheelchair (forelimb-directed) 12, except that in the case of the quadrupedal animal wheelchair (all-fours-directed) 14, depending not on whether the hind limbs are legs-erect but on whether the rear-wheel positions from telescoping of the rear-wheel wheel stays 112 are the upper positions or lower-end positions, the front wheels shift in the telescoping—in direction or the telescoping-out direction of the wheel stays 112.

With the load cell 134 situated on the axle 1102 of the sensor-directed wheel 120 or on the coupler 116 between the main frame 100 and the sensor-directed-wheel stay 122, and the load acting on the load cell 134 from the ground/floor being sensed, the judgment as to whether the rear wheels are in the lower-end position can be made also according to the magnitude of the load. When the rear wheels are in the upper position, the load from the ground/floor acting on the load cell 134 attached to the sensor-directed wheel 120 increases (FIG. 4 is referred to). On the other hand, when the rear wheels are in the lower-end position, the load from the ground/floor acting on the load cell 134 decreases (FIG. 6 is referred to). With respect to the load, a predetermined threshold value is established to judge whether the rear wheels are in the lower-end position or not.

Alternatively, situating a limit switch on the coupler 116 between the main frame 100 and the sensor-directed-wheel stay 122, and setting the limit switch so that it will go into its on state, and sense, when the hind limbs are leg-crouched, grounding the haunches are against the ground/floor, also enables the judgment as to whether the hind limbs are legs-erect. Furthermore, situating an angular rate sensor 132 on the coupler 116, rotatably connected to the main frame 100, for the sensor-directed-wheel stay 122 and measuring the rotational angle also enables judging whether or not the rear wheels are in the lower-end position.

In order to simplify control flow in the quadrupedal animal wheelchair (all-fours-directed) 14, rotation and rotational speed of the rear wheels may be sensed to shift the rear wheels in the telescoping-out direction of the wheel stays 112 and at the same time shift the front wheels in the telescoping-out direction of the wheel stays 112.

Furnishing the afore-described mechanisms enables a quadrupedal animal AN employing a quadrupedal animal wheelchair of the present invention to transition to a standing position, a sitting position, or a prone position without needing to receive human manual assistance.

In the present specification, with the drawings a description exemplifying a dog has been made, but the mechanisms of a quadrupedal animal wheelchair in the present invention are not limited to dogs and, as long as it switches between a sitting-position posture with the hind legs flexed and a standing-position posture with them stretched and ambulates on four legs, can be employed by animals regardless of body size, including cats, mice, cattle, and horses. Body size can be accommodated by changing the size of the form of the main frame 100 and the wheel stays 112. By employing a sensor for sensing the grounding load acting on the wheels 110, and exploiting the fact that the load acting on the wheels 110 grows smaller when the trunk or haunches of a quadrupedal animal AN is grounded against the ground/floor, setting that position as the upper-end position of the wheels 110 in the wheel stays 112 makes it possible to dispense with the trouble of setting the length of the extension and contraction of the linear actuators 1122 in the wheel stays 112 per size of the quadrupedal animal AN.

Industrial Exploitability

According to a quadrupedal animal wheelchair involving the present invention, inputting and analyzing the state of the wheels or the limbs sensed utilizing a sensor, determining the wheel position according to the obtained state of the wheels or the limbs, and changing the wheel position by means of a drive mechanism enables, with any quadrupedal animal having debilitations or disabilities in the limbs that ambulates by switching between flexing and stretching of the hind legs, transitioning with no receiving of human manual assistance from a standing position to a sitting or prone position, and also enables transitioning from a sitting-position or prone-position state to a standing position.

DESCRIPTION OF REFERENCE MARKS

10: quadrupedal animal wheelchair (hind-limb-directed)
12: quadrupedal animal wheelchair (forelimb-directed)
14: quadrupedal animal wheelchair (all-fours-directed)
100: main frame
102: harness
110: wheel
1102: axle
112: wheel stay
1122: drive mechanism (linear actuator)
114: coupler (coupling part between main frame and wheel stay)
116: coupler (coupling part between main frame and sensor-directed-wheel stay)
120: sensor-directed wheel
1202: axle (sensor-directed wheel)
122: sensor-directed-wheel stay
130: control unit
132: rotation sensor (angular rate sensor)
134: load sensor (load cell)
AN: quadrupedal animal
GND: ground/floor

The invention claimed is:

1. A quadrupedal animal wheelchair comprising:
a main frame for supporting a quadrupedal animal;
a harness, provided on the main frame, for cradling the trunk of the quadrupedal animal;
at least a pair of wheel stays provided on either side of the main frame;
wheels provided on lower ends of the wheel stays;
a control unit;
a sensor for sensing rotational state of the wheels; and
drive mechanisms for changing position of the wheels in the wheel stays, in either a direction of parting away from, or in a direction of approaching, the main frame; characterized in that
the control unit takes as input and analyzes wheel state sensed by the sensor, determines wheel position according to the wheel state, and commands the drive mechanisms to alter the wheel positions.

2. The quadrupedal animal wheelchair set forth in claim 1, characterized in that the drive mechanisms comprise a structure whereby the wheel-supporting wheel stays extend-contract upward and downward.

3. The quadrupedal animal wheelchair set forth in claim 1, characterized in having at the rear end of the main frame a sensor-directed wheel equipped with the sensor.

4. The quadrupedal animal wheelchair set forth in claim 1 or claim 3, characterized in further comprising a sensor for sensing load acting on the wheels or the wheel stays, or on the sensor-directed wheel or a stay for the sensor-directed wheel.

5. The quadrupedal animal wheelchair set forth in claim 1,
characterized in further comprising a sensor for sensing the quadrupedal animal's bearing.

* * * * *